United States Patent [19]

Falconieri

[11] Patent Number: 4,462,707
[45] Date of Patent: Jul. 31, 1984

[54] PRINTING AND/OR CORRECTING DEVICE FOR PRINTING MACHINES

[75] Inventor: Remo Falconieri, S. Giorgio C., Italy

[73] Assignee: Ing. C. Olivetti & C., S.p.A., Ivrea, Italy

[21] Appl. No.: 367,004

[22] Filed: Apr. 9, 1982

Related U.S. Application Data

[62] Division of Ser. No. 58,201, Jul. 17, 1979, abandoned.

[30] Foreign Application Priority Data

Jul. 18, 1979 [IT] Italy ............................... 68696 A/78

[51] Int. Cl.³ ............................................. B41J 33/14
[52] U.S. Cl. ..................................... 400/225; 400/175;
400/208; 400/212; 400/214; 400/229; 400/248; 400/697.1
[58] Field of Search ............ 400/175, 195, 196, 196.1,
400/207, 208, 212, 214, 225, 229, 235.1, 248,
568, 697.1, 902, 903; 74/88, 89; 318/119, 120,
159, 160, 556, 686; 310/92, 36, 37, 38, 39;
192/41 R, 45.1, 46, 53 H; 322/3

[56] References Cited

U.S. PATENT DOCUMENTS

| | | | |
|---|---|---|---|
| 1,851,543 | 3/1932 | Bossard | 310/38 X |
| 2,825,826 | 3/1958 | Sundt | 310/37 |
| 2,864,923 | 12/1958 | Mathews | 192/46 X |
| 3,283,876 | 11/1966 | Kern | 400/229 X |
| 3,623,582 | 11/1971 | Giger et al. | 192/46 |
| 3,707,214 | 12/1972 | Ponzano | 400/175 X |
| 3,838,567 | 10/1974 | Giger et al. | 192/46 X |
| 3,841,459 | 10/1974 | Buschmann et al. | 400/229 X |
| 3,918,569 | 11/1975 | Parker | 400/225 X |
| 3,935,934 | 2/1976 | Norberg | 192/46 |
| 3,939,957 | 2/1976 | Bittner | 400/229 X |
| 3,967,790 | 7/1976 | Hess | 400/196 X |
| 3,983,985 | 10/1976 | Guerrini et al. | 400/175 X |
| 3,995,731 | 12/1976 | Miller et al. | 400/229 X |
| 4,010,839 | 3/1977 | Guerrini et al. | 400/207 |
| 4,020,940 | 5/1977 | Daley et al. | 400/208 |
| 4,036,348 | 7/1977 | Guerrini | 400/175 X |
| 4,053,042 | 10/1977 | Hess | 400/248 X |
| 4,164,722 | 8/1979 | Garvey | 310/36 X |
| 4,203,677 | 5/1980 | Hatsell | 400/208 X |
| 4,232,976 | 11/1980 | Bernardis et al. | 400/229 X |
| 4,347,007 | 8/1982 | Schaefer | 400/229 |

FOREIGN PATENT DOCUMENTS

| | | | |
|---|---|---|---|
| 2337626 | 4/1974 | Fed. Rep. of Germany | 400/208 |
| 2030076 | 4/1980 | United Kingdom | 400/208 |

Primary Examiner—Ernest T. Wright, Jr.
Attorney, Agent, or Firm—Banner, Birch, McKie & Beckett

[57] ABSTRACT

The printing and correcting device is applied to a daisy-wheel printer and comprises a frame supporting a cartridge for a typing ribbon and a correcting ribbon arranged below the typing ribbon. The frame is able to swing as the result of operation of an electromagnet, from a rest position providing visibility of the print, to an intermediate position for printing the characters. A second electromagnet raises the frame through a greater length of travel in order to position the correcting ribbon in front of the printing point. A rotating electromagnet causes automatic unidirectional advance of the typing ribbon after each character has been printed. The correcting ribbon is wound between two spools and its motion is provided by means of a pawl which engages with a gear wheel for driving the spool only in the case where the path of travel of the frame is greater than that which relates to positioning of the typing ribbon.

A paper finger in the form of a sheet of limited thickness is provided with a cut out portion corresponding to the printing point, and with a guide in the form of a leaf spring for guiding the two ribbons adjacently to the typing paper when they are being raised and for preventing unwanted contact by these.

6 Claims, 9 Drawing Figures

FIG. 6
FIG. 7
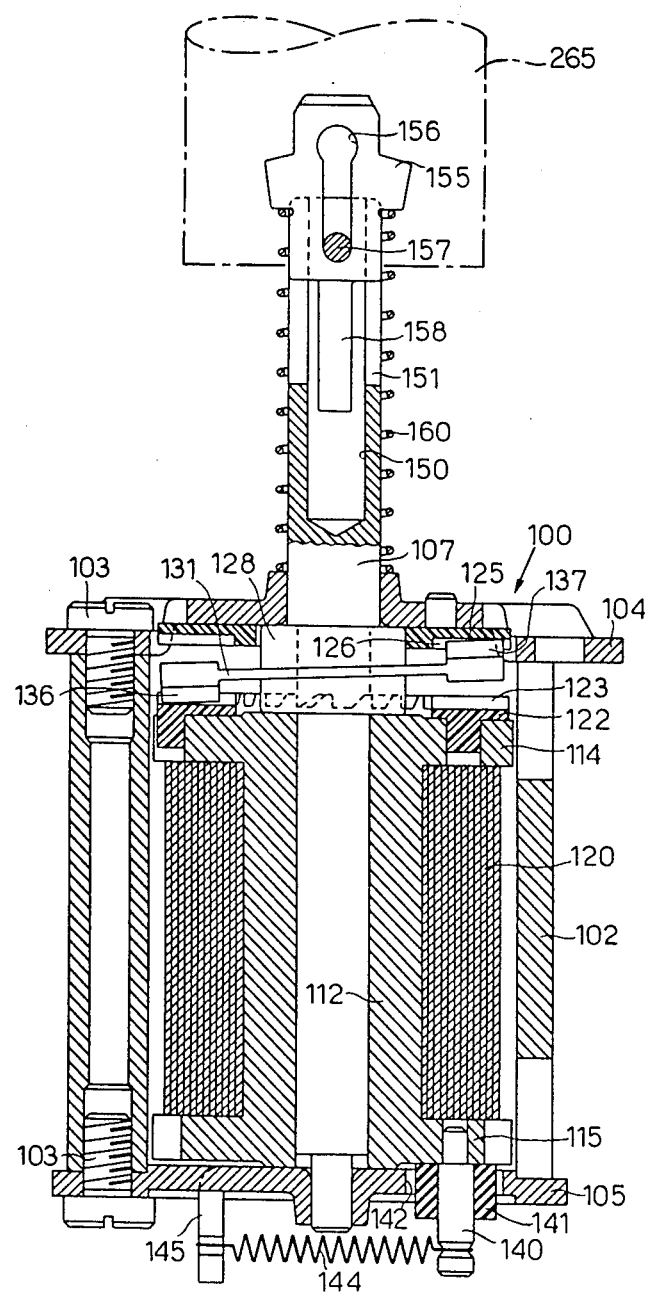
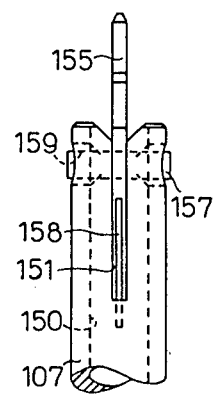

PRINTING AND/OR CORRECTING DEVICE FOR PRINTING MACHINES

This is a division, of application Ser. No. 058,201, filed July 17, 1979, now abandoned.

BACKGROUND OF THE INVENTION

The present invention relates to a printing and/or correcting device for printing machines, in particular of the type having electronic control.

Printing and/or correcting devices for typewriters are already known, but these are generally somewhat slow in operation and complicated.

SUMMARY OF THE INVENTION

A first aim of the present invention is to provide a device which is simple, fast and has great ease of use, in particular for printing machines of the electronic type.

A second aim of the invention is to provide a correcting device which can be used in printers in which the printing unit is very close to the platen. This is the case when the printing unit is for example made up by a character-bearing disc with flexible laminae.

A third aim of the invention is to provide a printing and/or correcting device, in which the forward motion of the corresponding ribbon takes place in a simple, reliable manner using inexpensive means.

BRIEF DESCRIPTION OF THE DRAWINGS

A preferred embodiment of the invention is given in the description which follows which is provided by way of non-limiting example with reference to the attached drawing in which:

FIG. 6 is a cross-section of some individual parts shown in FIG. 3;

FIG. 7 is a front view of some individual parts shown in FIG. 6;

DESCRIPTION OF A PREFERRED EMBODIMENT

Printing Mechanism

Figure 1:
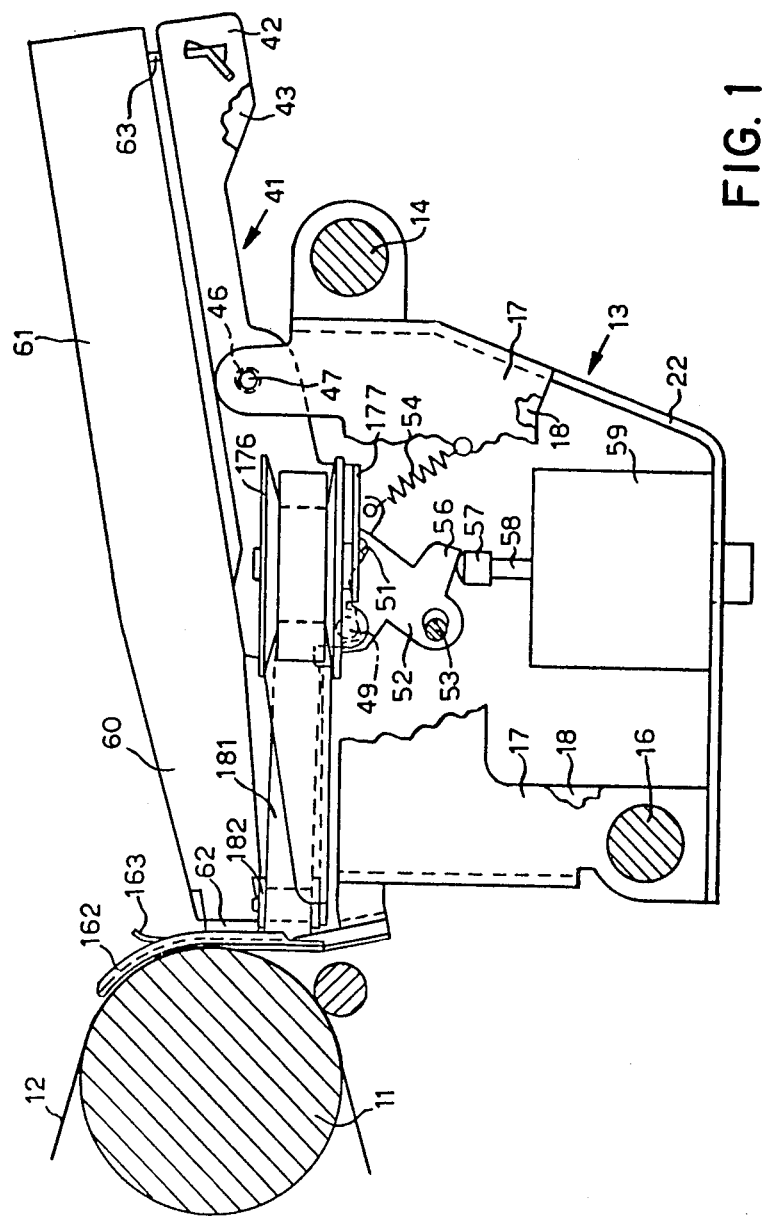
FIG. 1 shows a first partial cross-section of a printing machine.
Figure 3:
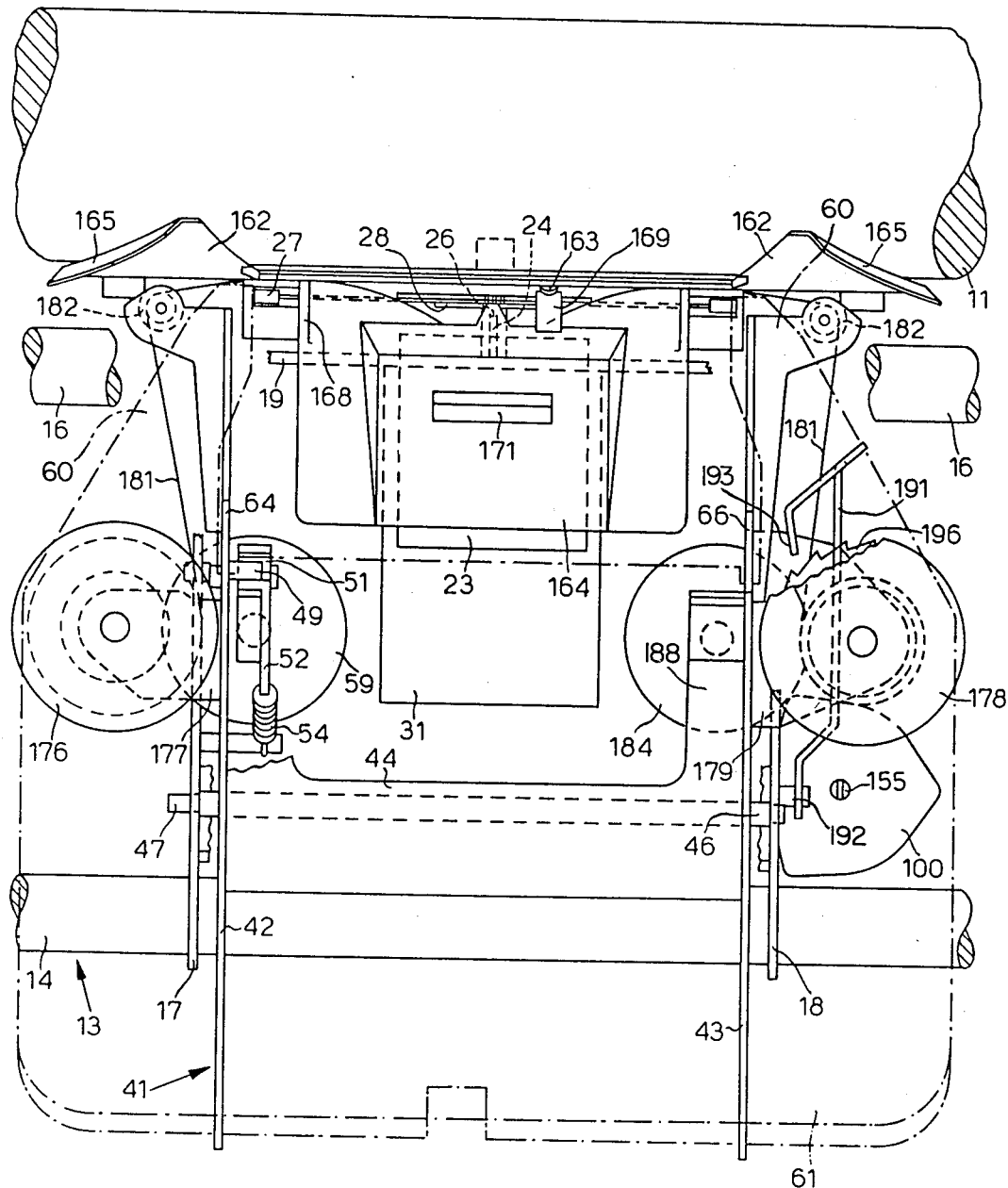
FIG. 3 is a partial plan view of the machine shown in FIGS. 1 and 2.

The printing device comprises a platen 11 for the typing paper 12 (FIG. 1) and a carriage 13 which can be moved transversely across the sheet of typing paper 12 along two guides 14 and 16. The carriage 13 is slidable on guides 14 and 16 in the two directions, for example as described in the U.S. Pat. No. 3,707,214. The carriage 13 is made up by side pieces 17 and 18, and a baseplate 22. An electromagnet 23 (FIG. 3), fixed to an upright 19, pivoting on the guide 16 carries a striker bar 24 having a shaped end 26 which cooperates with a character-bearing disc 27.

The character-bearing disc 27 is made of plastics material and is fixed to a flange 28 of a selector shaft 29 (FIG. 2), as described in U.S. Pat. No. 4,036,348. The selector shaft 29 is rotatable by means of an electric motor 31 fixed to the upright 19. The character-bearing disc 27 is of daisy-wheel type with flexible laminae 32 (FIG. 4) carrying print characters 33. Each lamina 32, on the opposite face to that carrying 33 the character is provided with a fine positioning wedge 34 which is designed to cooperate with a complementary notch in the end 26 (FIG. 3) of the striker bar 24.

Selection of the character 33 to be printed is carried out by means of the motor 31 in a known manner, for example as described in the U.S. Pat. No. 3,983,985.

Printing Ribbon Mechanism

A frame 41 (FIG. 3) is mounted on the carriage 13 and consists of two side plates 42,43, a central plate 44, and a sleeve 46 by means of which frame 41 pivots on a shaft 47 of the carriage 13. A spring 48 normally keeps the frame 41 rotated in the anti-clockwise sense in FIG. 2, arrested by means of a pin 49 (FIG. 3) sliding in a slot 51 of a cam 52 of the carriage 13.

Figure 5:
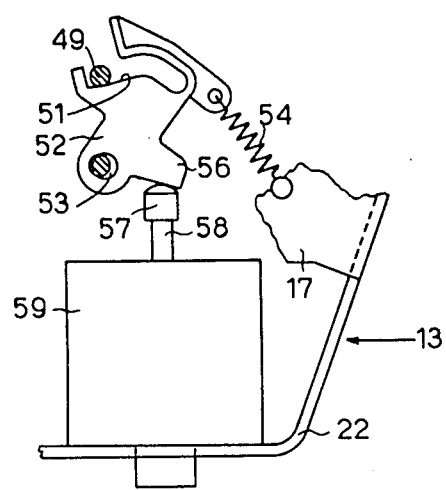
FIG. 5 is a side view giving details of some parts shown in FIG. 1.

The cam 52 (FIG. 5) is mounted on an eccentric 53 of the carriage 13 and, under the bias of a spring 54, is normally rotated in the clockwise sense and is arrested by means of a projection 56 against the end portion 57 of the plunger 58 of a solenoid 59 fixed to the carriage 13. The cam 52 reduces the stroke of the pin 49 with respect to the stroke of the plunger 58. The slot 51 is so shaped as to cooperate with the pin 49 when raising the printing ribbon 62 to the printing point and is open at one side in order to allow the pin 49 to pass out from it when the ribbon 62 and 181 are raised higher to bring the correcting ribbon 181 to the printing point.

A cartridge 61 (FIG. 2), for the printing ribbon 62 is substantially identical to that described in U.S. Pat. No. 4,010,839 and comprises two arms 60 for guiding a portion of the printing ribbon 62 external to the cartridge 61. The cartridge 61 is mounted on the frame 41 and is detachably held in position by a leaf spring 63 acted on by a tension spring 65, holding the cartridge 61 against two shoulders 64 and 66 (FIG. 3) which project from the side plates 42 and 43 respectively.

The printing ribbon 62 can be of the non-reusable carbon type or correctable type or of the fabric type operating in a closed loop. In each case a device 100 (FIGS. 3 and 6) provides for advance in one direction only of the printing ribbon 62, contained in the cartridge 61. Device 100 comprises a cylindrical stator 102 constructed of a ferromagnetic material, for example sintered iron, fixed to a side 18 of the carriage 13. The stator 102 has fixed to it, by means of screws 103, an upper flange 104 and a lower flange 105 of a non-magnetic material, for example stainless steel, in which a shaft 107 is mounted, which is rotatable coaxially in the stator 102.

Inside the stator 102, which is designed in such a way as to have three pole pieces 108, 109, 110 (FIG. 8), a rotor 112 of ferromagnetic material is provided, which is rotatably mounted with respect to the shaft 107. The rotor 112 is shaped so that two flanges 114 and 115 are provided (FIG. 6) which each have three pole pieces 116, 117 and 118 (FIG. 8) which are associated with the pole pieces 108, 109 and 110 respectively of stator 102. A winding 120 is provided between the two flanges 114 and 115 (FIG. 6), and this can be selectively energised in order to produce magnetic flux between the pole pieces 108, 109 and 110 and the pole pieces 116, 117 and 118.

A disc 122 of plastics material (FIGS. 6 and 8) is fixed on to the flange 114 of the rotor 112 and has frontal teeth 123 for unidirectional transmission of motion.

A disc 125, also of plastics material, is fixed on the upper flange 104 of stator 102, and has surface teeth 126 which face the teeth 123 of disc 122. The teeth 126 are also orientated so as to only allow transmission of motion in one sense only. A part 128 of plastics material is interposed between the discs 122 and 125 and is provided with a central bush 130 which is fixed to the shaft 107 and a peripheral ring 131, which is inclined with respect to the discs 122 and 125, and is connected to the central bush 130 by means of two radiating arms 132 and 134.

The peripheral ring 131 of part 128 has teeth 136 formed on its lower portion, which normally engage with the teeth 123 of disc 122 and is also provided with teeth 137 at its upper portion, which are diametrically opposed to teeth 136 and which normally engage with the teeth 126 of the disc 125.

Figure 9:
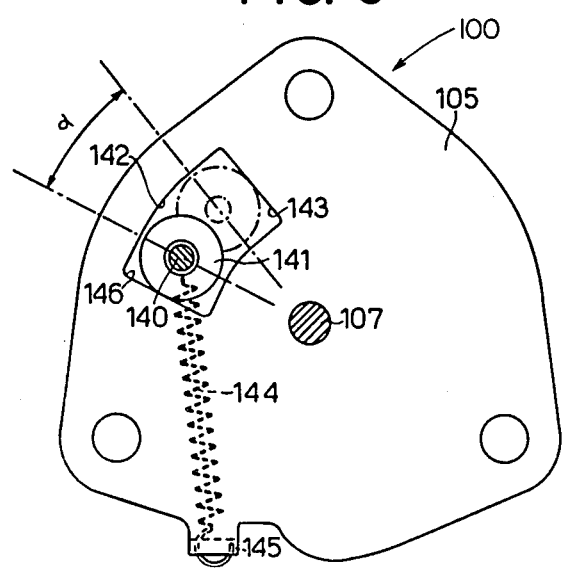
FIG. 9 is a view partly in cross-section and from below of some details of FIG. 6.

A stud 140 (FIGS. 6 and 9), carrying a rubber bush 141, is fixed to the flange 115 of the rotor 112 and projects from the stator 102 through a slot 142. A spring 144 is tensioned between a tongue 145 of the stator 102 and the stud 140 and maintains the rubber bush 141 against one wall 146 of the slot 142, thereby keeping the rotor 112 in the rest position. The rubber bush 141 is movable between the wall 146 and a wall 143 of the slot 142. The upper end portion of the shaft 107 is shaped in such a way that a cylindrical cavity 150 is provided, as well as a transverse slit 151 and a through hole 159, which is orthogonal to the slit 151 (FIGS. 6 and 7). The slit 151 houses, in a sliding manner, a blade 155, which is designed to engage with a sleeve 265 similar to the sleeve 63 shown in FIG. 2 of U.S. Pat. No. 4,010,839 mentioned above for the cartridge 61 for the forward motion of the inked printing ribbon 62. The blade 155 has a longitudinal slot 156 carrying a pivot pin 157, which is housed in the hole 159 through the shaft 107, and has a lower spigot 158 which is housed with a certain amount of play in the cavity 150. A helical spring 160 normally urges the blade 155 upwardly.

Figure 8:
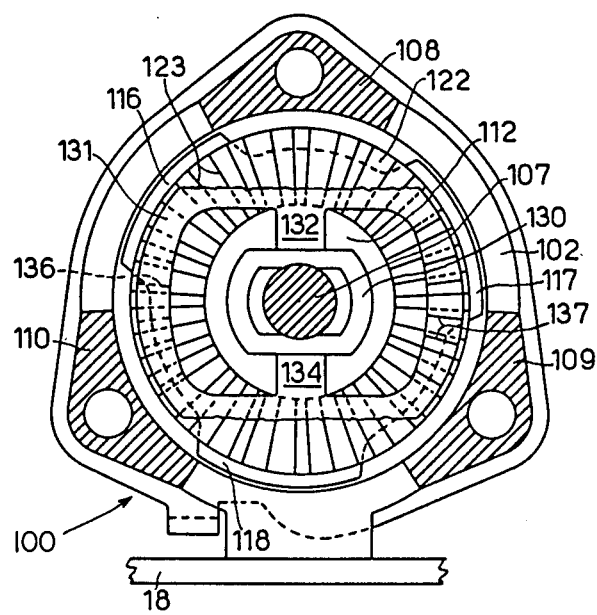
FIG. 8 is a plan view partly in cross-section of some details of FIG. 6.

Operation of the device 100 described above is as follows. In the rest position, the winding 120 is de-energised and rotor 112, acted on by spring 144 is located in a position where the pole pieces 116, 117 and 118 are offset with respect to the pole pieces 108, 109 and 110 of the stator 102 (FIG. 8). It will now be supposed that it is desired to automatically effect advance motion of the inked printing ribbon 62.

After each print of a character 33, the winding 120 is energized in any known manner, for a predetermined period of time, for example 25 msec, so as to generate magnetic flux between the rotor 112 and stator 102. Due to the effect of the magnetic flux, the pole pieces 116, 117 and 118 of rotor 112 become displaced into alignment with the pole pieces 108, 109, 110 respectively of the stator 102, thus providing for clockwise rotation of the rotor 112 with respect to the stator 102. The extent of the rotation is determined by the rubber bush 141 (FIG. 9) which comes into abutment against the wall 143 of the slot 142; the angle of rotation of rotor 112 is for example about 24°.

Due to the orientation of the teeth 123 of disc 122, and the teeth 126 of disc 125 (FIGS. 6 and 8), the part 128 and consequently shaft 107 also, are caused to rotate. As a result of this the sleeve 265, which is engaged by the blade 155, causes advance motion of the inked printing ribbon 62.

The winding 120 is then de-energized and spring 144 brings the rotor 122 back to the rest position. During this rotation (in the anti-clockwise sense in FIG. 8), the shaft 107 is not forced to move since the orientation of the teeth 126 of the disc 125 prevent rotation in the anti-clockwise sense of the part 128. Raising and lowering of cartridge 61 is followed by the blade 155, which is biased by means of the spring 160.

Figure 4:
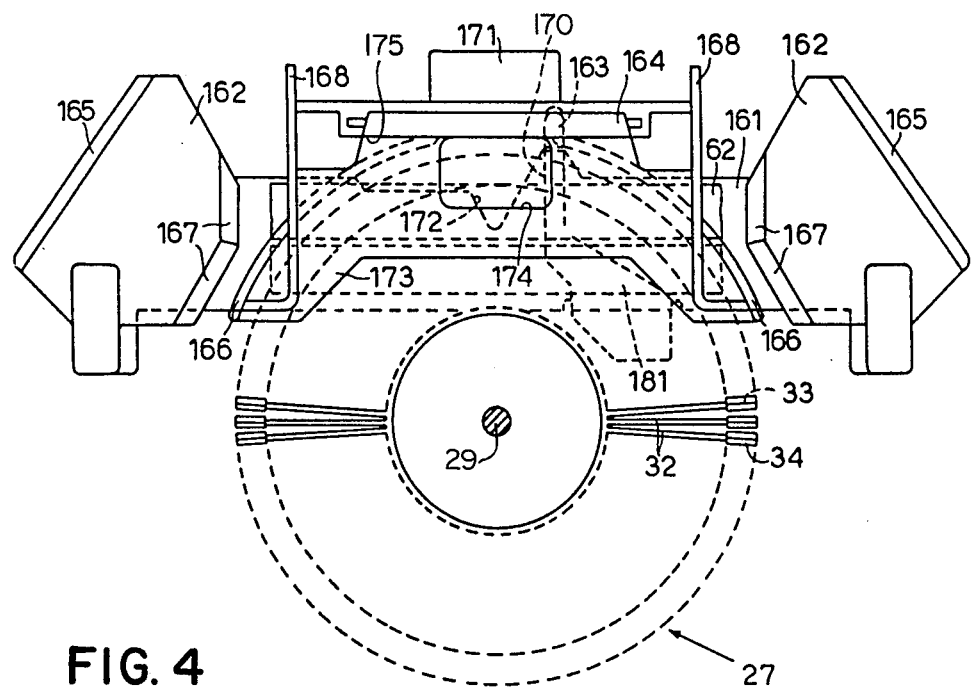
FIG. 4 is a partial front view of some parts shown in FIG. 3.

A paper guide which is made up by an element 161 of flexible sheet metal (FIG. 4) and by two parts 162 of transparent plastics material arranged at the sides of the sheet metal element 161, is fixed to the carriage 13. The paper guide element 161 comprises a leaf spring 163, which is arranged vertically at the side of the point of printing, and is designed so as to guide the external portion of the printing ribbon 62 between the character-bearing disc 27 and the element 161. The parts 162 in plastics material are arranged below and above the sheet metal element 161 and are provided with wings 165 and 167 which prevent the paper guide from catching on the edges of the typing paper 12. The paper guide element 161 of sheet metal is provided with a V-shaped notch 172 arranged in front of the point of printing in order to limit the area of contact of the printing ribbon 62 and of the correction ribbon 181. A V-shaped projecting part 170 is arranged adjacent to the V-shaped notch 172, and is aligned with the leaf spring 163 (as can be seen in FIG. 4) in order to prevent contact between the printing ribbon 62 and the typing paper 12, during the correction operation.

A cover 164 for the electromagnet 23 providing striking is fixed to the upright 19 and comprises a semi-circular shaped part 166 (FIG. 4) which has the purpose of shielding and protecting the upper part of the character-bearing disc 27. The cover 164 further includes a housing 175 for the electromagnet 23 which covers the space existing inside the cartridge 61 so as to prevent extraneous objects from entering between the character-bearing disc 27, platen 11 and electromagnet 23. The cover 164 includes two lateral guides 168 which are coplanar with the semicircular part 166, and which keep the printing ribbon 62 parallel to the platen 11, a shoulder 169 (FIG. 3), which is designed to cooperate with the leaf spring 163 in order to keep the ribbon 62 parallel to the character-bearing disc 27 and finally a hand grip 171 (FIG. 4), for rotating the character-bearing disc 27, motor 31 and electromagnet 23 from the print position to an inclined rest position, so that the character-bearing disc 27 can be changed after the cartridge 61 has been removed. In front of the paper guide element 161, the cover 164 is provided with a wall 173, having a hollow portion 174, corresponding to the V-shaped notch 172, which protects the front part of disc 27 and allows passage of the striker bar 24.

Figure 2:
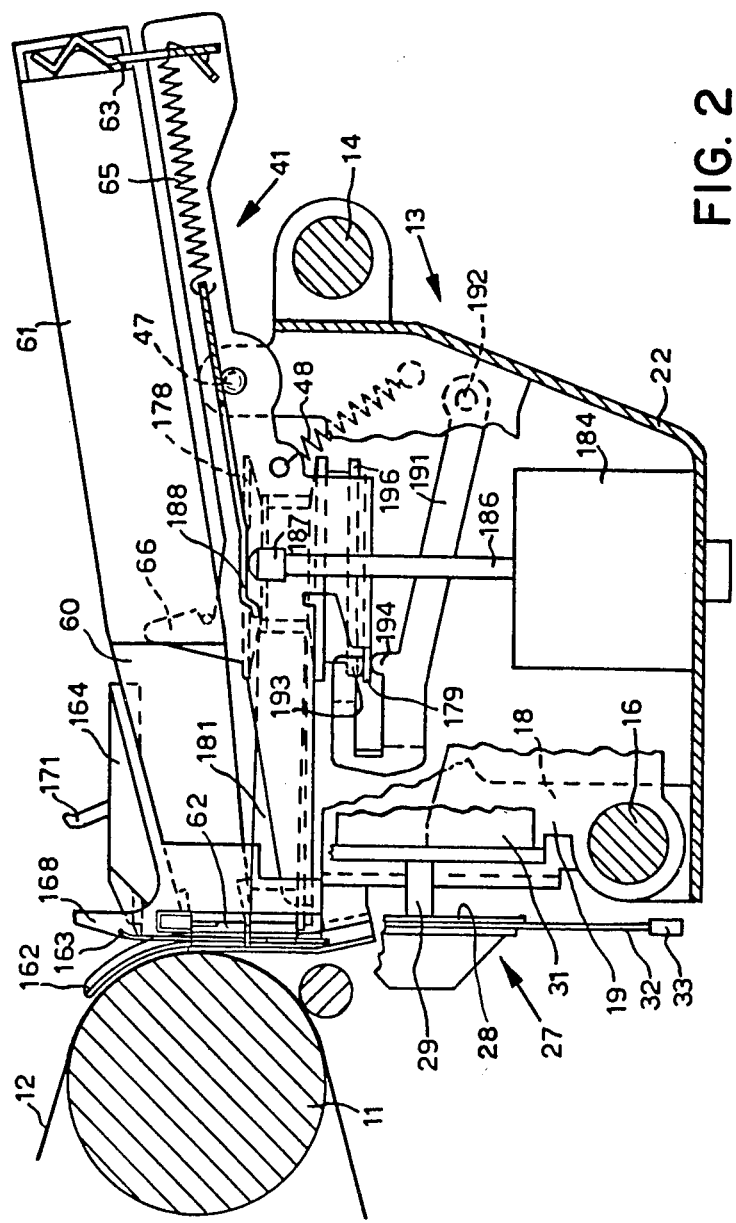
FIG. 2 is a second partial cross-section of the machine shown in FIG. 1.

Operation of the solenoid 59 is as follows. In each print cycle, the solenoid 59 (FIG. 1) is energized and the plunger 58 is raised and its end portion 57 causes the cam 52 to rotate in the anticlockwise sense against the action of spring 54. The eccentric 53 with the slot 51 (FIG. 5) raises the pin 49 and consequently the frame 41 as well, this being opposed by the action of spring 48 (FIG. 2). The frame 41 (FIG. 1) rotates in the clockwise sense and raises the cartridge 61 in order to position the printing ribbon 62 in the corresponding position for print. When the solenoid 59 is deenergized, the springs 48 and 54 bring the frame 41 back to the rest position, and the cartridge 61 and the cam 52 as well. With the cartridge 61 in the rest position, the operator is able to read the characters which have been written corresponding to the line of print. The particular shaping of slot 51 has the effect of preventing the frame 41 from being raised when the solenoid 59 raises its plunger 58 beyond the position of the point at which the character is being printed or oscillating about this particular point. It is possible for the solenoid 59 to be kept in the energized state by means of a current which is less than the initial current in order to keep the frame 41 and cartridge 61 in the raised position for repeated print cycles.

Correcting Ribbon Mechanism

The correcting ribbon device comprises a feed spool 176 (FIG. 3), which is rotatably mounted on a plate 177 of the side plate 42, and a take-up spool 178, which is rotatably mounted on a plate 179 of the side plate 43. The correcting ribbon 181, which may be of the lift-off type, or of the cover-up type, is guided between the two spools 176 and 178 by two ribbon guides 182, leaf spring 163 and by the semicircular shaped part 166 of the cover 164, so as to ensure that the correcting ribbon 181 remains arranged below the printing ribbon 62 and parallel both to the ribbon 62 and to the platen 11. The shaped part 166 furthermore prevents interference between the disc 27 and the ribbon 181.

A solenoid 184 (FIG. 2), which has characteristics which are substantially identical to those of the solenoid 59, includes a plunger 186 having an end portion 187 against which a shoulder 188 of frame 41 is normally held under the influence of the spring 48. The plunger 186 (FIG. 3) has the same stroke as the plunger 58 and operates on the shoulder 188, while the plunger 58 operates on the pin 49 through the cam 50 which reduces the stroke of the plunger 58. A ratchet lever 191 pivots on a pivot pin 192 of the carriage 13 and is guided by means of two shoulders 193 (FIG. 2) and 194 on the plate 179 in order to cooperate with a ratchet wheel 196 connected to the take-up spool 178.

Operation of the correcting ribbon device is as follows. The solenoid 184 is energized, whereby the plunger 186 and the end portion 187 raise the shoulder 188, causing the frame 41 to rotate in the clockwise sense against the action of the spring 48. The frame 41 consequently raises the cartridge 61, spools 176 and 178, printing ribbon 62 and correcting ribbon 181, up to the point where the correcting ribbon 181 is located at the point of print. The printing ribbon 62 is consequently raised beyond its normal operating position. The two ribbons 62 and 181 are still guided by the leaf spring 163 and the guide 168 which take the place of the shaped part 166 when guiding the correcting ribbon 181.

During this raising operation, the ratchet lever 191, pivoting on the pivot pin 192 fixed to the carriage 13, engages the ratchet wheel 196 via shoulder 193 and causes the take-up spool 178 to rotate in the anti-clockwise sense, thus causing the correcting ribbon 181 to advance. When the solenoid 184 is de-energized, the spring 48 brings the frame 41 together with cartridge 61 and spools 176 and 178 carrying the ribbons 62 and 181 back to the rest position.

Among possible modifications, the raising of the frame 41 could be carried out in a different manner to that which has been described. For example, one of the solenoids could provide for the raising of the frame 41 from the rest position up to a first print position, whilst the other electromagnet could provide for a subsequent raising of the frame 41 to achieve the correcting position. However in the embodiment described, the solenoids have identical strokes but the lift given by the solenoid 59 is reduced by the mechanism illustrated in FIG. 5.

The leaf spring 163 and the guide 166 and/or 168 could be used in printers which differ from the one which has been described, but in which the distance between the printing element and the sheet of paper is as restricted as it is here. A typical example is printers using styli or wires. The necessary modifications to the spring 163 and to guides 166 will be readily accessible to these skilled in the art.

The embodiments of the invention in which an exclusive property or privilege is claimed are defined as follows:

1. A device for intermittently advancing a ribbon in a printing machine, comprising a part for drawing said ribbon along; a motor unit having a cylindrical rotor and a stator movable with respect to the rotor for an alternating motion, wherein the stator and rotor include a plurality of corresponding pole pieces and wherein said stator is actuatable with an impulse of magnetic flux for positioning said rotor to a position where the corresponding pole pieces of the stator and the rotor are faced therebetween; a coupling device which is interposed between the rotor and the part for drawing the ribbon along in order to transform the alternating movements of the rotor into a unidirectional movement of the part for drawing the ribbon along; wherein said coupling device comprises a shaft connected with the part for drawing the ribbon along, first and second members coaxial with the shaft and fixed to the rotor and stator respectively, and an intermediate part which is interposed between said first and second members wherein said first and second members having facing frontal teeth and wherein said intermediate part comprises a central bush fixed to the shaft and a peripheral ring which is inclined with respect to said first and second members and is connected to said central bush, wherein said peripheral ring includes a first series of teeth normally engaged with the teeth of the first member fixed to the rotor and a second series of teeth, which are diametrically opposed to the first series and normally engaged with the teeth of the second member fixed to the stator, and wherein the frontal teeth of said first and second members are so oriented as to only allow transmission of movement from the rotor to the shaft in one sense only; and a stroke limiting device which is interposed between the rotor and the stator for limiting the stroke of the rotor with respect to the stator, said limiting device comprising positioning means for positioning the rotor in a predetermined rest position and returning means for returning the rotor to the rest position after the positioning of said rotor to a position where the corresponding pole pieces of the stator and the rotor are faced therebetween.

2. A device according to claim 1, wherein the rotor is substantially coaxial with said part for drawing the ribbon along.

3. A device according to claim 2, wherein the rotor comprises two terminal flanges having the plurality of pole pieces which can face the corresponding plurality of pole pieces of the stator.

4. A device according to claim 3, wherein said intermediate part comprises a flexible lamina to cause the teeth thereof to resiliently engage the frontal teeth of said first and second members.

5. A device according to claim 4, wherein the lamina is of a plastic material.

6. A device according to claim 5, wherein said ribbon is a printing ribbon which is contained in a cartridge, wherein said cartridge is swingable about an axis between a rest position and a working position, and wherein said shaft has a slot in which a blade slides axially and which is constantly engaged with said part for drawing the ribbon along in a region which is adjacent to the axis of swinging of the cartridge.

* * * * *